US008201255B1

(12) United States Patent
Nachenberg (10) Patent No.: US 8,201,255 B1
(45) Date of Patent: Jun. 12, 2012

(54) HYGIENE-BASED DISCOVERY OF EXPLOITED PORTALS

(75) Inventor: Carey Nachenberg, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 395 days.

(21) Appl. No.: 12/494,792

(22) Filed: Jun. 30, 2009

(51) Int. Cl.
*G06F 11/00* (2006.01)

(52) U.S. Cl. .......................................... 726/24; 713/188

(58) Field of Classification Search ................. 713/187, 713/188; 726/22, 23, 24
See application file for complete search history.

(56) References Cited

U.S. PATENT DOCUMENTS

| | | | |
|---|---|---|---|
| 7,284,124 B1 | 10/2007 | Ginsberg | |
| 7,617,519 B2 | 11/2009 | Williams | |
| 7,761,912 B2 | 7/2010 | Yee et al. | |
| 7,788,700 B1 | 8/2010 | Feezel et al. | |
| 7,831,522 B1 | 11/2010 | Satish et al. | |
| 7,870,609 B2 | 1/2011 | Hulten et al. | |
| 2004/0019807 A1* | 1/2004 | Freund | 713/201 |
| 2006/0253583 A1 | 11/2006 | Dixon et al. | |
| 2007/0033636 A1 | 2/2007 | Buckley et al. | |
| 2007/0064617 A1 | 3/2007 | Reves | |
| 2007/0067844 A1* | 3/2007 | Williamson et al. | 726/24 |
| 2007/0094260 A1* | 4/2007 | Murphy et al. | 707/9 |
| 2007/0168311 A1 | 7/2007 | Genty et al. | |
| 2008/0022384 A1 | 1/2008 | Yee et al. | |
| 2008/0052758 A1 | 2/2008 | Byrnes | |
| 2008/0092235 A1 | 4/2008 | Comlekoglu | |
| 2008/0133531 A1 | 6/2008 | Baskerville et al. | |
| 2008/0141366 A1 | 6/2008 | Cross et al. | |
| 2009/0172815 A1 | 7/2009 | Gu et al. | |
| 2009/0240769 A1 | 9/2009 | Schran | |
| 2009/0282476 A1 | 11/2009 | Nachenberg et al. | |
| 2009/0328209 A1 | 12/2009 | Nachenberg | |
| 2009/0328224 A1 | 12/2009 | Hernacki et al. | |

OTHER PUBLICATIONS

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.
Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/ >.
Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>. Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.
"TrustedSource™ : the Next-Generation Reputation System White Paper," Secure Computing Corporation, Oct. 2006, 6 pages.
Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.
European Extended Search Report, European Application No. 09169538.7, Oct. 25, 2010, 5 pages.

* cited by examiner

*Primary Examiner* — Christopher Brown
(74) *Attorney, Agent, or Firm* — Fenwick & West LLP (57) ABSTRACT

A hygiene-based determination of legitimacy of activities performed by applications on clients is performed. A receiving module receives, from a client, information regarding an application that is performing an activity on the client. A hygiene score module determines a score distribution for hygiene scores of other clients on which the same type of application has performed the same activity. A correlation module correlates the activity being performed by the application on the client with the score distribution for hygiene scores. A reputation computation module computes, based on the correlation, a reputation score for the activity with respect to the application performing the activity. Finally, a legitimacy identification module identifies, based on the reputation score, whether the activity is an illegitimate activity for the application. Where the activity is illegitimate for the application, a malware management module can conduct various techniques for managing the application which is likely infected with malware.

20 Claims, 6 Drawing Sheets

HYGIENE-BASED DISCOVERY OF EXPLOITED PORTALS

BACKGROUND OF THE INVENTION

1. Field of the Invention

This invention pertains in general to computer security, and more specifically to hygiene-based detection of portals exploited by malware.

2. Description of the Related Art

Computer systems are continually threatened by possible attack from malicious computer code (e.g., viruses, worms, and Trojan horses), making computer security a prominent concern. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

One method commonly employed by malicious entities is the use of injection techniques to inject their logic into a legitimate process (e.g., svchost.exe). This legitimate process is then used as a safe haven to introduce malware executable files onto a system, effectively making the process a "malware portal" through which a computer can be infected. Similarly, many of the latest attacks gain control of a system by executing a buffer overflow attack on a legitimate application or by running a malicious script in a legitimate application, such as MICROSOFT® WORD or ADOBE® ACROBAT®. In this manner, the attacker can take control of the application and then use this legitimate application to install malware onto the system.

In these types of malware portal attacks, the attackers can use various different applications through which to introduce malicious code onto a computer. These applications are sometimes forced to perform activities that they would not normally perform in their standard operation. For example, infected programs may be forced to create new executable files (e.g., malicious files) whether or not this is an activity normally performed by the programs. While various programs regularly perform a collection of different activities, it is not known which activities are legitimate for which programs.

Therefore, there is a need in the art for a solution that determines the legitimacy of different activities for different applications to identify whether a given application has been compromised by malware.

DISCLOSURE OF INVENTION

The above and other needs are met by a method, computer-implemented system, and computer program product in which a security module performs a hygiene-based determination of legitimacy of activities performed by applications on clients. An embodiment of the method comprises receiving, from at least one client, information regarding an application that is performing an activity on the client. The method further comprises determining a score distribution for hygiene scores of other clients on which a same type of application has performed a same activity. In addition, the method includes correlating the activity being performed by the application on the client with the score distribution for hygiene scores of the other clients on which the same type of application has performed the same activity. The method also comprises computing, based on the correlation, a reputation score for the activity with respect to the application performing the activity. The method additionally includes identifying, based on the reputation score, whether the activity is an illegitimate activity for the application. In some embodiments, the method includes performing various techniques (e.g., implementing a security policy, notifying the client of the potential infection, etc.) for managing the application performing the illegitimate activity which is likely infected with malware.

In an embodiment of the system, a receiving module receives, from at least one client, information regarding an application that is performing an activity on the client. In some embodiments, the receiving module also receives the hygiene scores of all such clients on which the same type of application has performed the same activity. A hygiene score module determines a score distribution for hygiene scores of those clients on which a same type of application has performed a same activity. A correlation module correlates the activity being performed by the application on the client with the score distribution for hygiene scores of the other clients on which the same type of application has performed the same activity. A reputation computation module computes, based on the hygiene scores of each client performing the monitored activity, a reputation score for the activity with respect to the application performing the activity. Finally, a legitimacy identification module identifies, based on the reputation score, whether the activity is an illegitimate activity for the application. In some embodiments, a malware management module performs various techniques for managing the application performing the illegitimate activity which is likely infected with malware.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
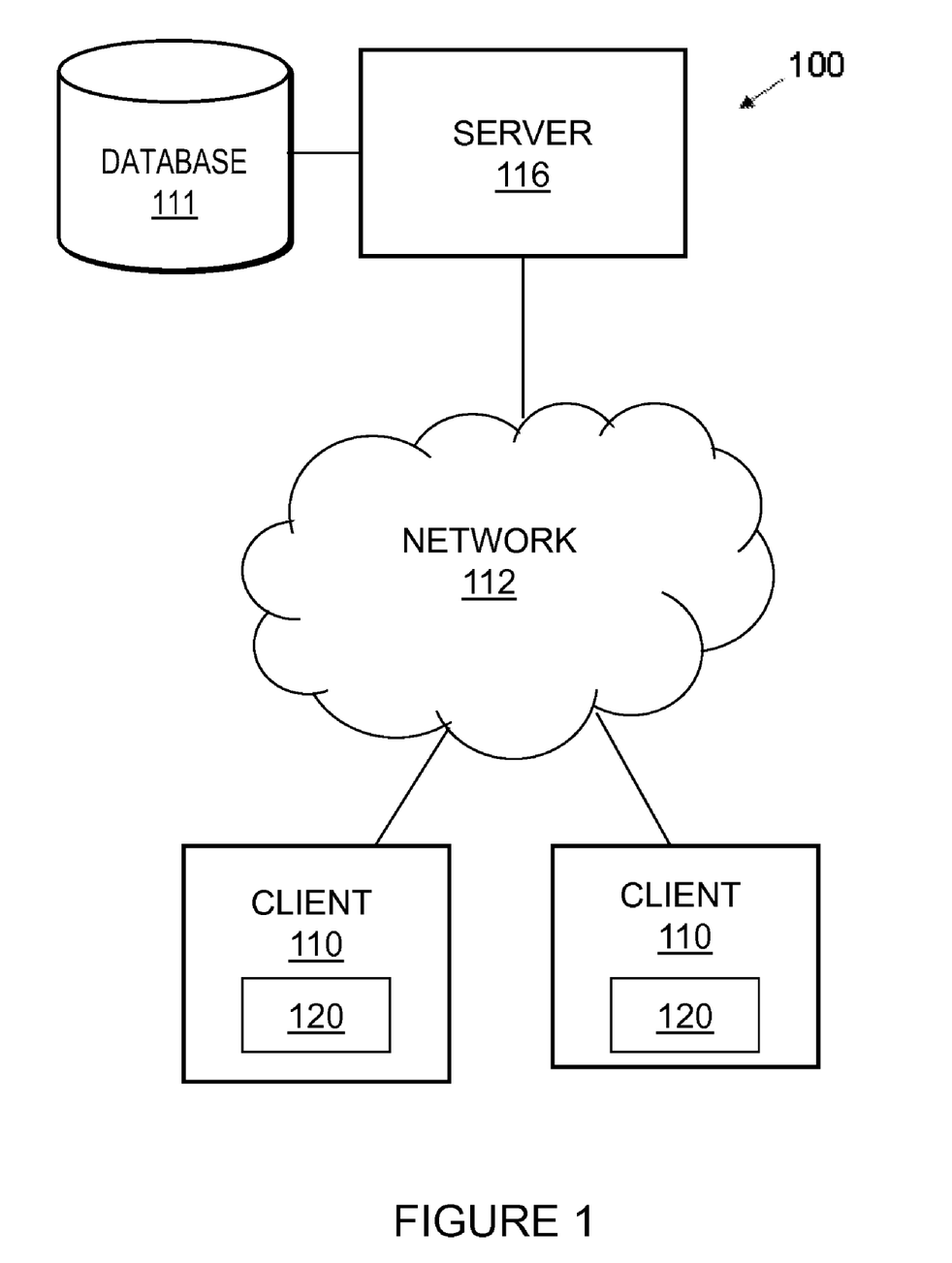
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a server 116 and clients 110 connected by a network 112. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The server 116 serves information or content to client computers 110 via the network 112. In one embodiment, the server 116 is located at a website provided by SYMANTEC™ CORPORATION, although the server can also be provided by another entity. The server 116 can include a database 111 storing information and a web server for interacting with clients 110. The server 116 can send information (e.g., security policy information, a notification of the legitimacy of an activity performed by an application, etc.) stored in the database 111 across the network 112 and to the clients 110. The server 116 can also receive information (e.g., information about an application that is performing an activity) from clients 110.

In one embodiment, the server 116 also receives hygiene scores from the clients 110, which are computed and tracked by each client 110, though the server 116 can also compute the hygiene scores itself based on the data received from the clients 110. As used herein, the term "hygiene score" represents an assessment of the trustworthiness of the client 110, where the "trustworthiness" refers to the client's propensity for becoming infected or being already infected by malware and other computer related threats. A client 110 that is infected more often or conducts risky behavior likely to lead to infection is less trustworthy and will have a poorer hygiene score than a client 110 who does not have these characteristics. For example, the hygiene score of a client 110 can be based on client system settings and what settings are enabled or disabled, whether current security software updates or patches have been installed or are being installed regularly, whether the client 110 requires regular password changes, how often the client 110 is infected with malicious code, and so forth. A client 110 without the latest software updates or that is often infected with malware may receive a poorer hygiene score than a client with the latest updates or fewer or no malware infections.

In some embodiments, the client's score is also affected by actions taken by users on the client 110, including how often suspicious websites are visited (e.g., websites suspected to or known to result in malware infections of the client 110 when visited), how often suspicious files are downloaded (e.g., files suspected to or known to be infected or result in infection of the client), and so forth. Clients 110 that tend to visit suspicious websites, download suspicious files, and take other risky actions will receive lower hygiene scores than clients which do not take these actions.

In the embodiment illustrated in FIG. 1, the server 116 performs a hygiene-based determination of the legitimacy of activities performed by applications on clients 110. For example, the server 116 can determine which applications are legitimate introducers of executable code (e.g., a web browser or a self-updater, such as SYMANTEC™ LIVEUPDATE) and which applications are illegitimate introducers (e.g., ADOBE® ACROBAT® READER or ADOBE® FLASH PLAYER). The program, ADOBE® ACROBAT®, should not normally introduce executable code onto a computer. If this program does perform this activity, the program may be infected by malicious code. However, an update program for ADOBE® ACROBAT® would legitimately introduce executable code in its updating of ADOBE® programs. As another example, the server 116 can also determine which applications are legitimate injectors of code into other processes (e.g., YAHOO® IM) and which applications are illegitimate code injectors. The server's legitimacy determination can be used to detect and block future exploitation of an otherwise legitimate application. As used herein, "malicious code" or "malware" is any code that enters a computer without an authorized user's knowledge and/or without an authorized user's consent with the intention of conducting malicious activities on the computer or on other computers. As used herein, a "malware portal" is any application or process that is used as a safe-haven for introducing malware onto a computer or conducting unauthorized activities on the system (e.g., stealing information and sending it to an attacker). One or more of the functions of the server 116 can also be executed on the client 110 or in a cloud computing environment.

The clients 110 are computers or other electronic devices used by one or more users 110 that can interact with the server 116 or other clients 110. The clients 110, for example, can be personal computers executing a web browser that allows the user to browse and search for information available at a website associated with the server. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS®, and PALM OS®), which controls the operation of the computer system, and execute one or more application programs. The clients 110 can perform activities and make requests for or otherwise acquire information (e.g., information about which applications should be permitted to perform certain activities) from the server 116 or other computers. The clients 110 can also send information (e.g., identities of applications that performed activities, etc.).

In the embodiment illustrated in FIG. 1, the client 110 executes a security module 120 for receiving and applying legitimacy determinations from the server 116, and for implementing security policies or instructions from the server 116 for managing malware problems. The security module 120 can be a discrete application program, or the module 120 can be integrated into another application program or into an operating system for the server 116. In some embodiments, a portion or all of the security module 120 is executed on the server 116 on in a cloud computing environment.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
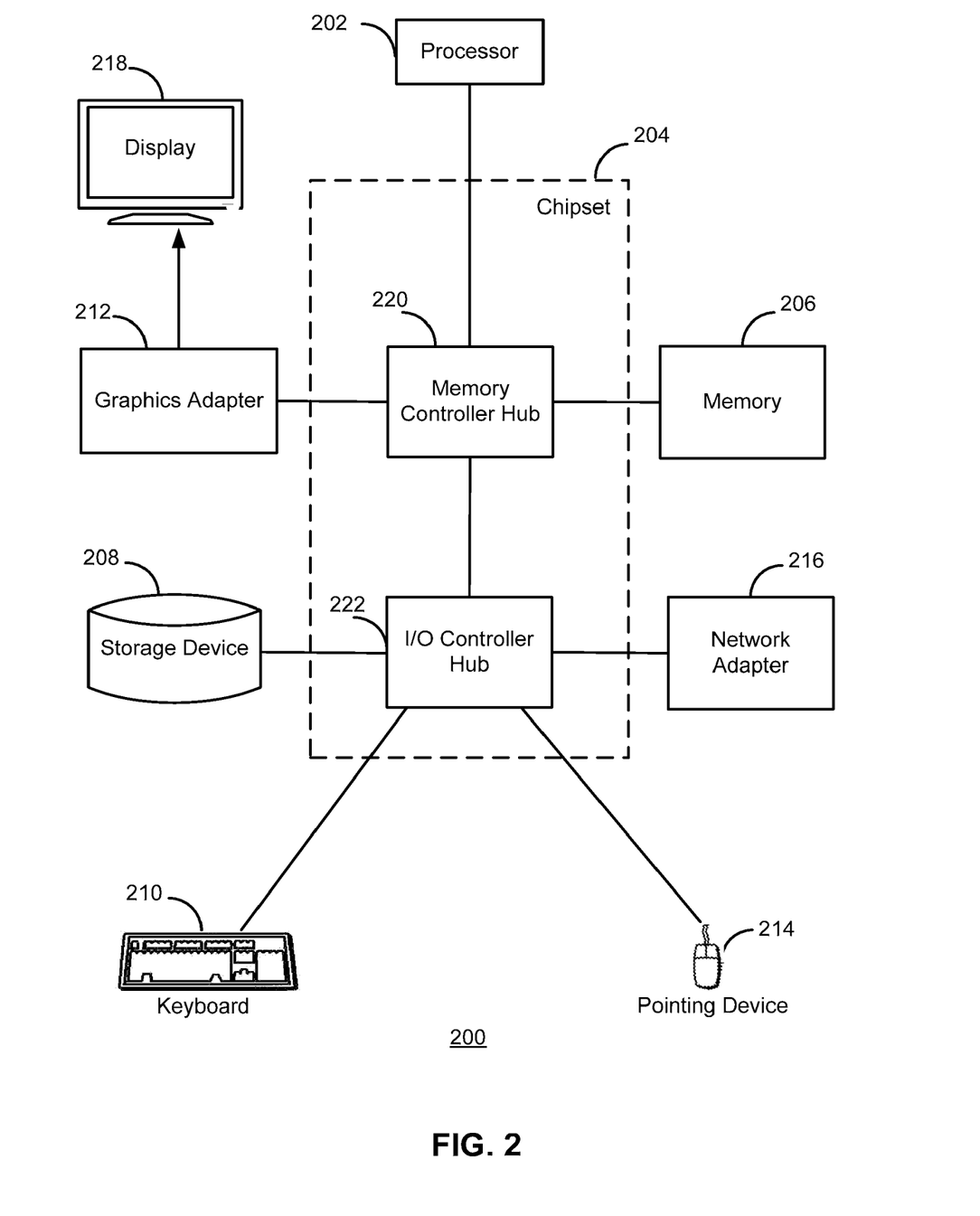
FIG. 2 is a high-level block diagram illustrating a computer system 200 for use with the present invention.

FIG. 2 is a high-level block diagram illustrating an example of a computer 200 for use as a server 116 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
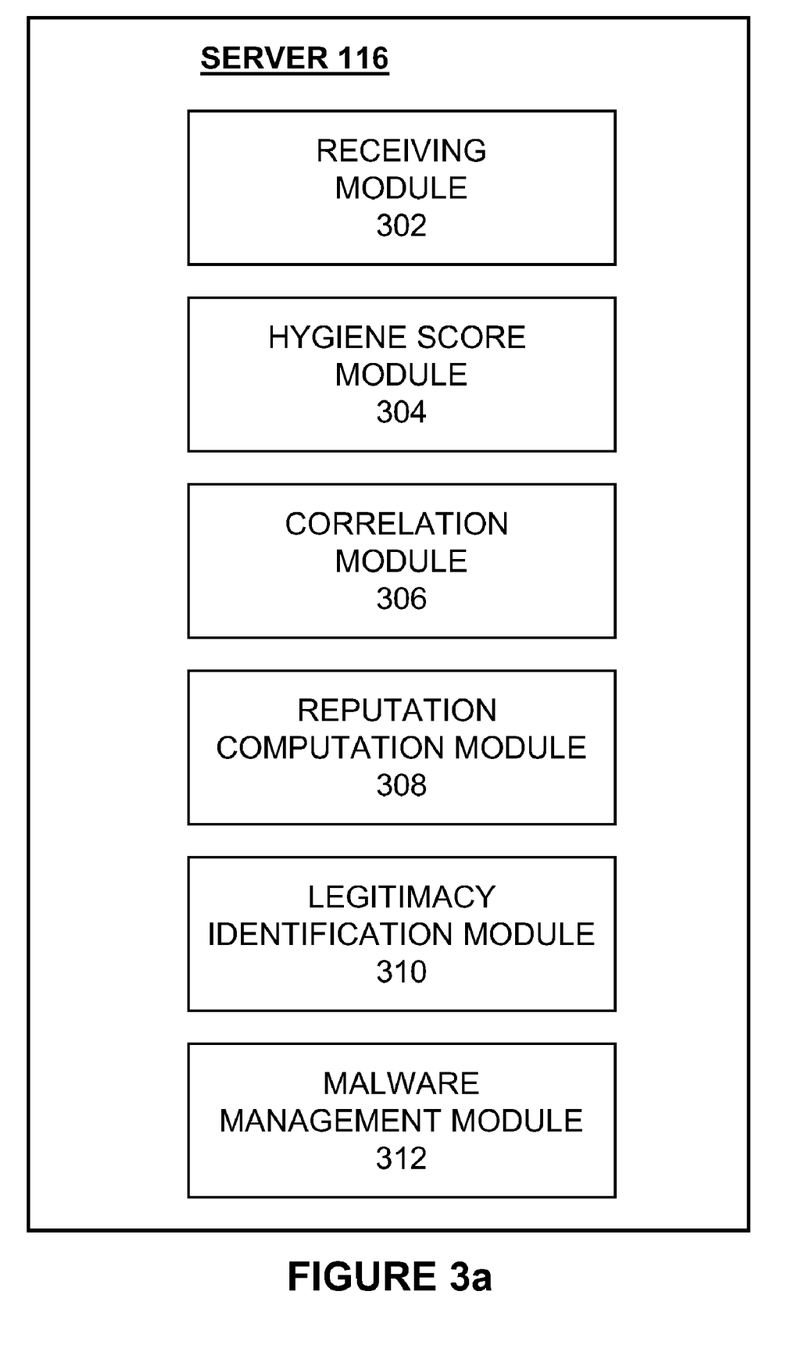
FIG. 3a is a high-level block diagram illustrating the functional modules within the server 116, according to one embodiment of the present invention.

FIG. 3a is a high-level block diagram illustrating the functional modules within the server 116, according to one embodiment of the present invention. The server 116, in the embodiment illustrated in FIG. 3a, includes a receiving module 302, a hygiene score module 304, a correlation module 306, a reputation computation module 308, a legitimacy identification module 310, and an optional malware management module 312. Some embodiments of the server 116 have different and/or additional modules than those shown in FIG. 3a and the other figures, and the functionalities can be distributed among the modules in a manner different than described herein. The same is true of FIG. 3b. Certain modules and functions can be incorporated into other modules of the server 116, and/or other entities on the network 112, including the client 110.

The receiving module 302 receives, from a client 110, information regarding an application that is performing an activity on the client 110. If the client 110 detects that an application running on the client 110 is in the process of performing an activity or has performed an activity on the client 110, the client 110 can send certain information regarding this over to the server 116.

The receiving module 302 can receive information about various different activities performed on the client 110. In one embodiment, the module 302 receives information about an application that has introduced an executable file on a client 110. For example, if the program ADOBE® ACROBAT READER has created or is attempting to create a new executable file on the client 110, the receiving module 302 can receive information about this from the client 110. In another embodiment, the module 302 receives information about an application that has injected code into another process. For example, if the program MICROSOFT® WORD has injected or is attempting to inject code into a process, the receiving module 302 can receive information about this from the client 110. Similarly, in other embodiments, the module 302 receives information about other activities that have been performed or are in the process of being performed. For example, the module 302 can receive information about an application modifying a registry key, accessing a piece of data, accessing private user information (such as documents, passwords or settings), or performing any other activity that could possibly or would likely be used to introduce malicious code onto the client 110, to steal information from the client, or to damage information on the client. In a further embodiment, the receiving module 302 receives information about every activity, or every major or important activity, that is performed by applications on clients 110.

The receiving module 302 can receive various types of information from the client 110 about an application performing an activity. In one embodiment, the module 302 receives an identity of the application that conducted the activity. For example, the module 302 could receive a name of the application (e.g., MICROSOFT® WORD), the application's path, the hash value for the application (e.g., using one of the Secure Hash algorithms (e.g., SHA-2) or the Message-Digest Algorithm 5 (MD5)) and any other identifiers for that application. The module 302 can further receive an identification of the activity being performed. For example, the client 110 can send to the module 302 information about what the application did or what it was attempting to do (e.g., introduce a new executable file, modify a registry key, etc.). The module 302 can also receive information about when the activity occurred or was started by the application, when it ended, how long it took, and other details about the activity, such as the specific machine language instruction in the application that initiated the tracked behavior. The module 302 can further receive information about the target of the activity or what the activity would affect (e.g., what process the application is attempting to inject code into, what executable file the application is creating, what registry key is being modified, what data is being accessed, etc.). The module 302 can also receive information about the hygiene of the client 110, including the current hygiene score for the client 110 or other information that can be used to compute the hygiene for that client. Each client 110 has a hygiene score, and the scores can be regularly updated as the hygiene of the client 110 changes over time. The clients 110 can regularly report their hygiene scores, or data required to compute their hygiene scores, to the server 116.

The timing for receipt of information from the module 302 can vary. In one embodiment, the client 110 immediately detects that an application is performing an activity about which the client 110 should report to the server 116. In this case, the client 110 sends the information to the receiving module 302 before or during the attempted activity. In another embodiment, the client 110 detects the activity after it has occurred (e.g., the executable file has already been created), and sends this information to module 302. The module 302 can receive information from multiple clients as activities are occurring on those clients. In one embodiment, the receiving module 302 is receiving and processing this information simultaneously from a large number of different clients.

The hygiene score module 304 determines a score distribution for hygiene scores of other clients on which a same type of application has performed a same activity. As used herein, the term "same type of application" refers to the same application, such as two instances of the program "MICROSOFT® EXCEL" running on two different clients. For example, if the receiving module 302 received information from a particular client that a particular program is creating/persisting an executable file on that client, the hygiene score module 304 can determine a score distribution for hygiene scores of other clients on which that same program has also created/persisted an executable file. If a particular application X has performed behavior Y on a specific 10,000 clients, the module 304 can determine the hygiene score distribution of those 10,000 machines for determining whether that behavior Y of application X tends to be associated with machines with good or bad hygiene scores.

The hygiene score module 304 can determine a score distribution for hygiene scores in a number of ways. In one embodiment, the server 116 already has access to hygiene scores for each of the clients 110 which are stored in database 111 and updated as clients 110 send updated scores to the server 116. The module 304 can thus filter information stored in database 111 to retrieve and review the hygiene scores of the particular clients on which the same type of application has performed the same activity. In one embodiment, the module 304 determines an average or a median rate of infection of these other clients by malware. If the average or median infection rate of these other clients is greater than the average or median infection rate of all clients, then this indicates that the activity performed by the application is more likely malicious or there is evidence that application is infected by malware. As an example, if the receiving module 302 receives information about an application trying to reformat the hard drive of client X, the hygiene score module 304 can review hygiene scores of other clients on which the application has tried to reformat the hard drives and determine the average infection rate of those other clients. If there are five other clients 110 on which the application has tried or has successfully reformatted hard drive of that client 110 and all five machines are associated with at least ten infections each over the last month, then the average infection rate for these other clients is ten.

The correlation module 306 correlates the activity being performed by the application on the client 110 with the score distribution for hygiene scores of the other clients on which the same type of application has performed the same activity. The information received by receiving module 302 about the activity is correlated with the score distribution of other clients on which the application is doing the same activity. Continuing with the example above, if the average infection rate of ten for the five clients 110 is greater than the average infection rate for all clients 110, then this indicates that the reformatting of hard drives by the application is associated with machines having a poor hygiene score. The reformatting of client X's hard drive is correlated with this information for determining whether or not reformatting of a hard drive is a proper action for that application.

The reputation computation module 308 computes, based on the correlation, a reputation score for the activity with respect to the application performing the activity. As used herein, the term "reputation score" represents an assessment of the likelihood that an activity performed by an application is malicious (e.g., is a computer-related threat). An activity that is believed to be malicious will have a poorer reputation score than an activity that is not likely malicious.

The particular activity (e.g., introduction of a new executable file) is given a reputation score for the particular application that is performing the action (e.g., MICROSOFT® WORD). The score indicates a reputation for that activity performed by that application. While it may be appropriate for programs like YAHOO!® INSTANT MESSENGER to regularly inject code into other processes (e.g., to check for machine idleness), a program like ADOBE® FLASH PLAYER should never perform such a code injection unless the program is compromised (i.e., infected by malware). Thus, the activity of code injection into other processes by such a potentially compromised program will receive a poor reputation score from the module 308. A poor reputation score is a score that is lower than a score that is given to a legitimate activity performed by the same application or a legitimate activity performed by an uninfected application.

Various different reputation scoring systems can be used. In one embodiment, the reputation score is a numeric value similar to the hygiene score. The reputation score is normalized within a given range, such as zero and one, in order to allow direct comparisons across reputation scores of different entities. For example, a score of zero can represent the lowest reputation (e.g., indicating that the application should not normally perform the activity unless infected) while a score of one can represent the highest reputation. In other embodiments, the reputation score is quantized into one of a limited set of values.

The reputation score can be assigned using various different techniques. The techniques used can include techniques involving machine learning algorithms, Bayesian networks, neural networks, decision trees, and other similar techniques. In one embodiment, the reputation score for the activity with respect to the application is assigned in a manner similar to the assignment of hygiene scores for clients.

The legitimacy identification module 310 identifies, based on the reputation score, whether the activity is an illegitimate activity for the application. If the activity is given a good or positive reputation score, it is determined to be a legitimate activity for the application to perform. If the activity performed by the application is given a poor or negative reputation score, the module 310 determines it to be an illegitimate activity for the application. An activity that might be illegitimate for one application might be completely legitimate for another application to perform. For example, while it may be determined that Acrobat.exe should never legitimately introduce new executable files onto a client 110, the introduction of new executable files onto a client 110 can be a perfectly legitimate activity for Acrobatupdater.exe, as stated above. Thus, clients 110 for which Acrobat.exe has created/persisted executable files will have lower hygiene scores than clients for which Acrobat.exe does not create/persist executable files. Creating/persisting executable files will be given a negative reputation score and will be found to be an illegitimate activity for Acrobat.exe. Machines for which Acrobat.exe creates/persists executable files are likely infected with malware, and Acrobat.exe will be determined by the module 310 to be a malware portal. In contrast, Acrobatupdater.exe creates/persists executable files (e.g., new versions of Acrobat) on both good and bad hygiene machines. Thus, the activity of creating/persisting executable files for Acrobatupdater.exe will be given a more neutral score.

In some embodiments, there is a threshold reputation score, under which the activity is considered illegitimate, and above which the application is considered legitimate for the application. In other embodiments, there is more than one threshold reputation score or there can different ranges of scores that are treated differently. For example, there can be a low range of scores, where activities having scores in that range are considered illegitimate for that application. There can be a high range, where activities having scores in that range are considered legitimate for that application. In some embodiments, there can be a middle range, where activities having scores in that range are considered suspicious or possibly illegitimate. The module 310 can identify the activity using such a middle category or can default to the safer action of identifying the action as illegitimate until further analysis is conducted, and later updating the identification if needed. Various other categories or identification types can be made depending on the configuration of the module 310, and various other scoring or rating systems can be used for classifying the legitimacy of activities.

In some embodiments, the legitimacy identification module 310 is further configured for tracking and storing information about applications that are known to perform certain activities for use in future malware identification. For example, when an application has been identified as performing an illegitimate activity X, the module 310 can categorize that application as a known performer of illegitimate activity X. This tracked data can be stored in database 111 for future use in identifying illegitimate activities on other clients. As another example, if application Y performed activity X on one client, which was determined to be an illegitimate activity, this information can be stored in database 111. When a second client reports that application Y performed activity X on that client, the stored information about application Y/activity X can be used to quickly and automatically identify that this is an illegitimate activity for application Y, so application Y on the second client is likely also infected with malware. Similarly, the module 310 can store information about known legitimate activities for an application.

In some embodiments, the server 116 includes a malware management module 312 for managing situations in which an activity was determined by the legitimacy identification module 310 to be an illegitimate activity for the application. The malware management module 312 can manage possible malware situations in a variety of manners. In one embodiment, the module 312 notifies the client 110 that the activity has been identified as an illegitimate activity for the client 110. The notification can indicate to the client 110 to block the application from performing the illegitimate activity and to block future performance of the illegitimate activity by the application. In this manner, the client 110 can implement a lock down of that application with respect to performing the illegitimate activity.

In another embodiment, the malware management module 312 implements a security policy for multiple clients 110. The security policy can require the blocking of all applications of the same type from future performance of the illegitimate activity on those clients. For example, if the legitimacy identification module 310 determines that a particular program should never introduce executable files onto a client 110, the malware management module 312 can implement a security policy that requires that all clients 110 prevent that program from introducing new executable files. In this manner, the module 312 can reduce the chance that the program will be compromised in a manner that allows it to introduce new malware onto the client 110, since it will be locked down with respect to executable introduction. As another example, a particular program might only access a user's password information from a web browser on the client 110 that is often infected with malware or has poor hygiene. Even though accessing certain data normally would not be an indicator of possible infection by malware, in this case, since this activity by this program is performed on low hygiene machines, the activity is more likely to be associated with infections. Thus, the malware management module 312 can safely require that this activity be blocked for that program.

In other embodiments, the malware management module 312 performs other types of malware management in response to an activity being identified as illegitimate for the application. In one example, the module 312 instructs the client 110 to taint the reputation of all products created by the application while performing that activity. For example, if the activity is the creation of executable files, each file created can be tainted so that a security detection system (e.g., an antivirus or other malware detection program) can more easily detect that a newly created executable is suspicious. Similarly, other malware management can include notifying the client 110 to quarantine the application, to quarantine files created by the application, to perform an antivirus scan of the client 110, and so forth.

Figure 3B:
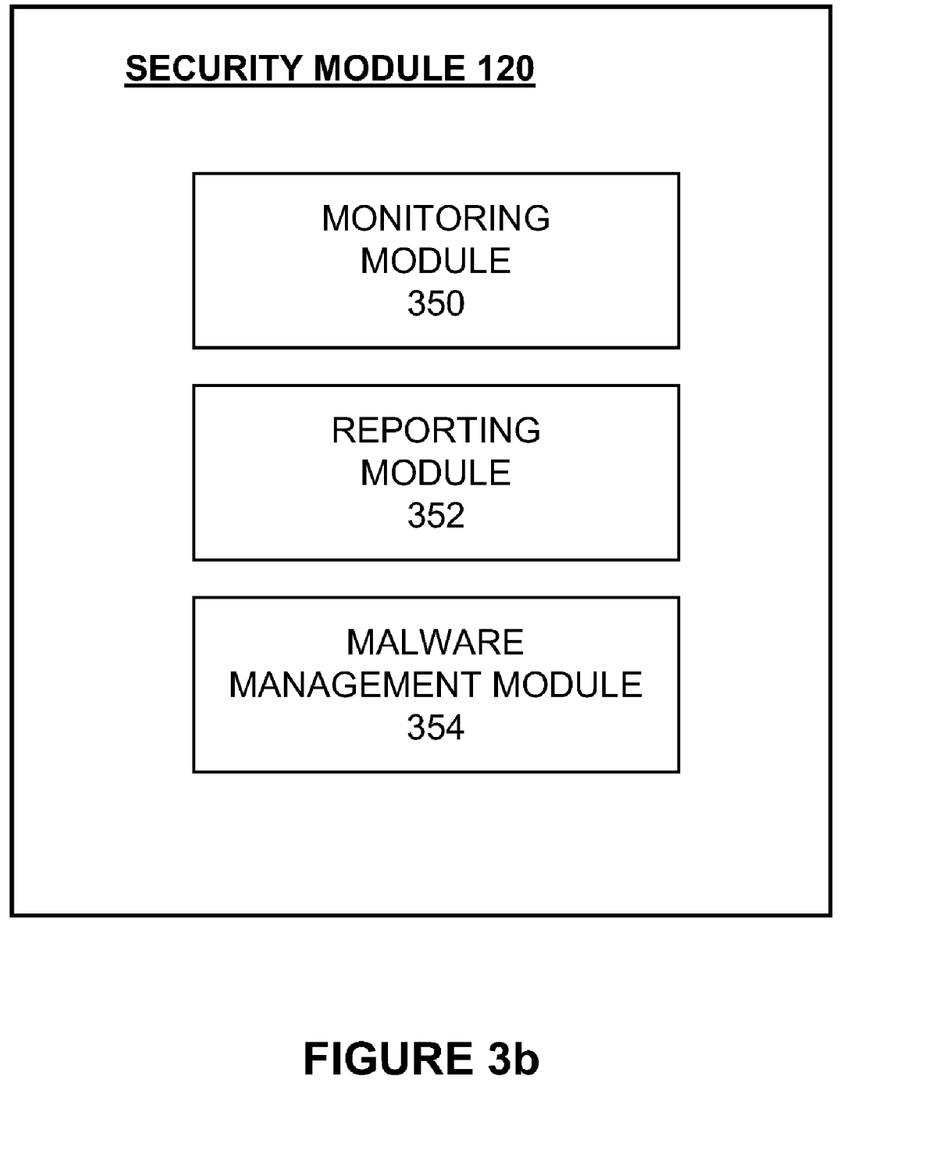
FIG. 3b is a high-level block diagram illustrating the functional modules within the security module 120, according to one embodiment of the present invention.

FIG. 3b is a high-level block diagram illustrating the functional modules within the client 110, according to one embodiment of the present invention. The security module 120, in the embodiment illustrated in FIG. 3b, includes a monitoring module 350 reporting module 352, and a malware management module 354. Certain modules and functions can be incorporated into other modules of the security module 120 and/or other entities on the network 112, including the server 116.

The monitoring module 350 monitors the client 110 for activities being performed by an application on the client 110. In one embodiment, the module 350 monitors for specific activities that should be reported to the server 116 (e.g., activities that the server 116 has determined in advance should be reported), or monitors for possibly malicious activities. In another embodiment, the module 350 monitors for all activities or all major or important activities conducted by applications.

The reporting module 352 reports to the server 116 (e.g., to the receiving module 302) information about an application performing an activity (e.g., an activity detected by the monitoring module 350). The module 352 can report any of the types of information described above in detail with respect to the receiving module 302 description, including the identity of the application, the activity, the target of the activity, the product of the activity, a current machine hygiene score or update, and so forth. The module 352 can report this information about various different applications performing various different activities, as explained above regarding the receiving module 302.

The malware management module 354 receives any information sent from the server regarding the legitimacy of the activity and manages any malware problems. In one embodiment, the module 354 has instructions regarding how to react to a legitimate or an illegitimate activity. If the server 116 indicates that the activity is legitimate, for example, the module 354 can allow the activity to occur and allow the application to continue to perform that activity. If the server 116 indicates that the activity is illegitimate, the module 354 can then take actions to manage the malware threat. In some embodiments, the server 116 sends no information back. In this case, the activity may be legitimate and so is allowed to proceed (or may have already proceeded), or the server 116 may have rolled out a security policy for preventing that activity by the application on all clients 110.

The malware management module 354 can take one or more actions to deal with malware threats, including blocking the activity from occurring, quarantining the application or a file or other product of that activity, locking-down the application to prevent further performance of that activity, running an antivirus scan, etc. The module 354 can also taint files or products of the activity (e.g., by linking them to an identifier or other mechanism) so that these can easily be detected by a security system or antivirus scanner on the client 110. In another embodiment, the module 354 waits for further instructions from the server 116 or takes a preliminary action (e.g., quarantining or locking-down the application), and then waits for additional instructions from the server.

Figure 4:
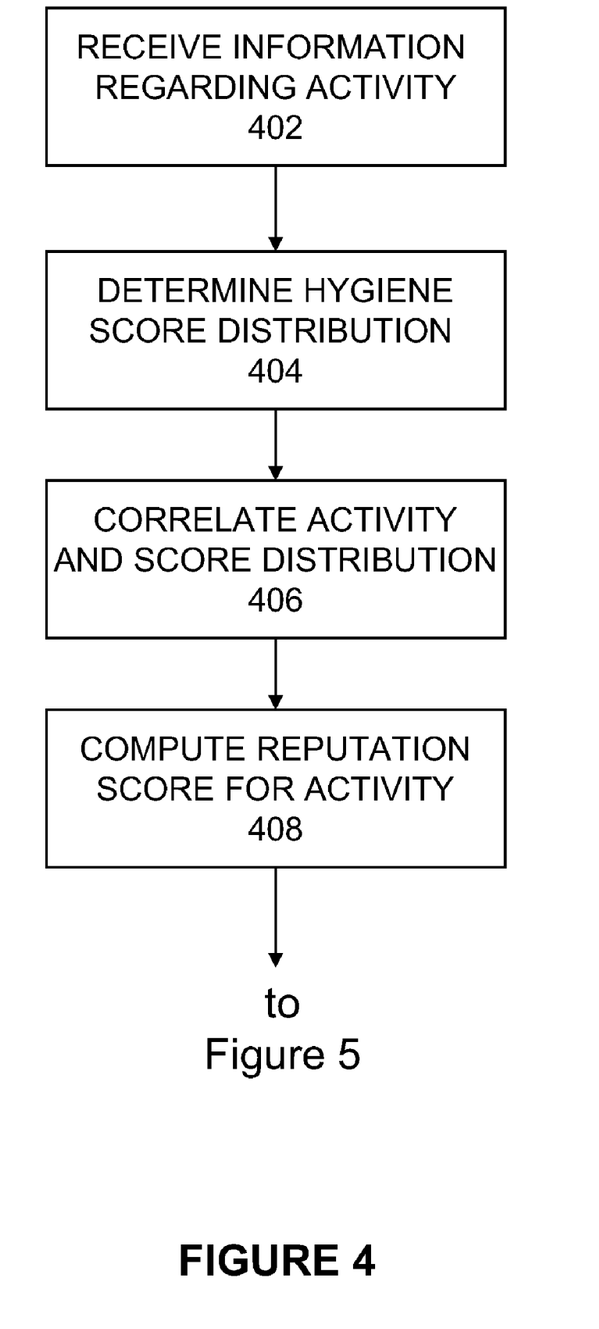
FIG. 4 is a flowchart illustrating steps performed to compute a reputation score for an activity performed by an application, according to one embodiment of the present invention.

Referring now to FIG. 4, there is shown a flowchart illustrating the operation of the server 116, according to some embodiments of the present invention. Specifically, FIG. 4 illustrates the steps of the server 116, involving computing the reputation score for the activity performed by the application. It should be understood that these steps are illustrative only. Different embodiments of the server 116, may perform the illustrated steps in different orders, omit certain steps, and/or perform additional steps not shown in FIG. 4 (the same is true for FIG. 5).

As shown in FIG. 4, the server 116 receives 402, from a client 110, information regarding an application that is performing an activity on the client 110. The types of information and activity were described in detail above. The server 116 determines 404 a score distribution for hygiene scores of other clients on which a same type of application has performed a same activity. As explained above, the server 116 can review the hygiene scores of the other clients and can determine an average or a median rate of infection of the other clients by malware. If the average/median rate of infection of these other clients is greater than the average/median rate of infection by all clients, the activity performed by the application is likely or is more likely malicious. The server 116 correlates 406 the activity being performed by the application on the client 110 with the score distribution for the other clients. The server 116 then computes 408, based on the correlation, a reputation score for the activity with respect to the application performing the activity.

Figure 5:
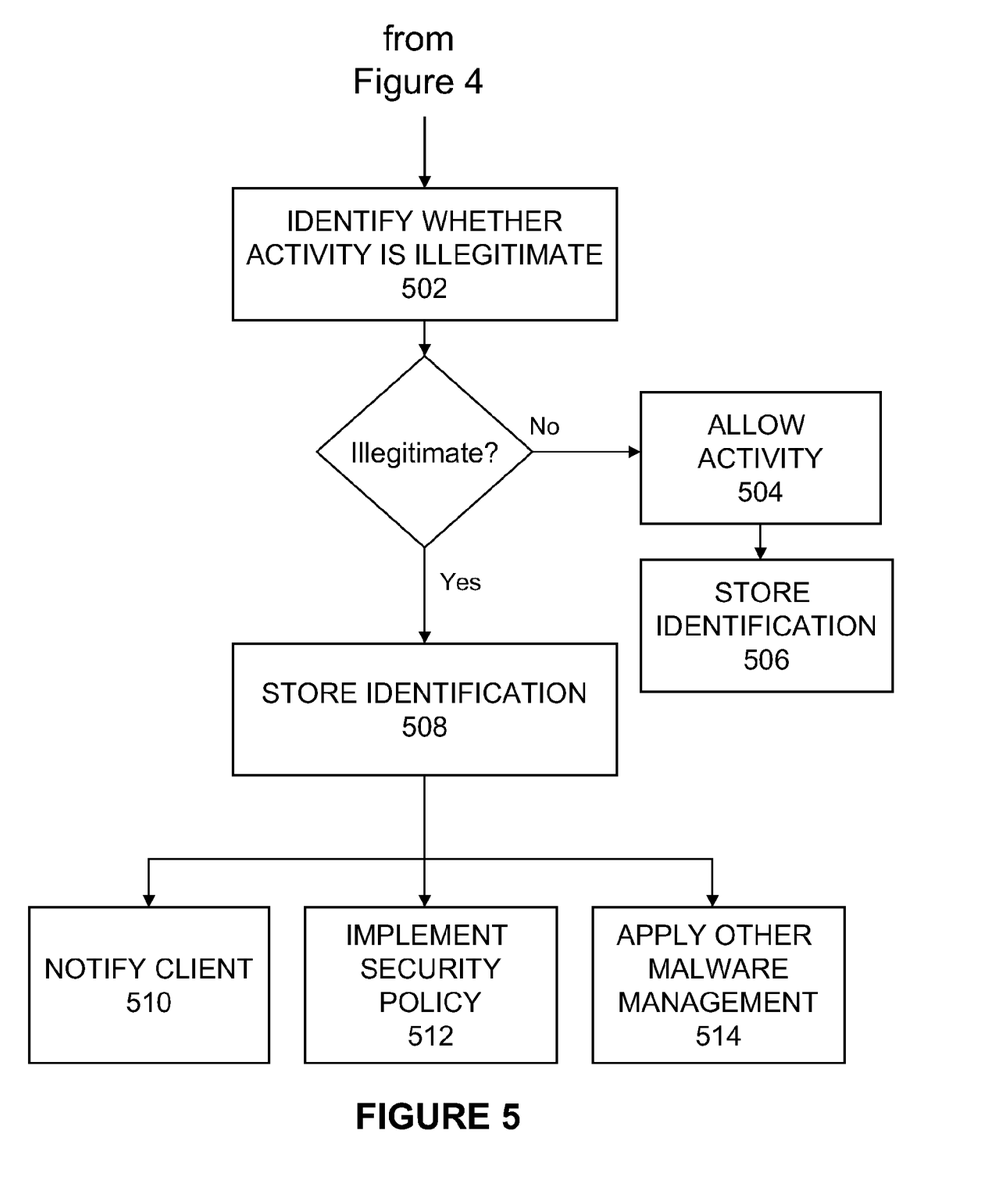
FIG. 5 is a flowchart illustrating steps performed to identify the legitimacy of the activity, according to one embodiment of the present invention.

Referring now to FIG. 5, there is shown a flowchart illustrating the operation of the server 116, according to some embodiments of the present invention. Specifically, FIG. 5 illustrates the steps of the server 116 involving identifying the legitimacy of the application. The server 116 identifies 502, based on the reputation score, whether the activity is an illegitimate activity for the application. Where the activity is identified to be a legitimate activity for the application, the server 116 allows 504 the activity to occur. In some embodiments, the server 116 notifies the client that the activity is legitimate for the application, and should be permitted to proceed (or, where it has already occurred, should not be prevented in the future). The server 116 can also store 506 this information for use in future identifications of legitimate/illegitimate activities. Where the activity is identified to be an illegitimate activity for the application, the server 116 can also store 508 this information. The stored information can be applied to future instances to automatically determine that the same application performing the same activity on another client is likely infected by malware. Similarly, the server 116 can store 508 information categorizing the application as a known performer of the illegitimate activity.

Where the activity was identified as illegitimate, the server 116 can also apply various techniques to manage this situation. In one embodiment, the server 116 notifies 510 the client 110 that the activity has been identified as an illegitimate, and indicates to the client 110 to block the application from performing the illegitimate activity. In another embodiment, the server 116 implements 512 a security policy for multiple clients 110, the security policy requiring blocking of applications of the same type from future performance of the illegitimate activity on those clients 110. In a further embodiment, the server 116 applies 514 other malware management techniques, including requiring tainting of files created via the legitimate process, tainting of illegitimately injected code, running an antivirus scan, etc. The server 116 can perform any one of steps 510, 512, and 514 or can perform more than one or all of these steps.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

I claim:

1. A computer-implemented method of hygiene-based determination of legitimacy of activities performed by applications on clients, the method comprising:

receiving, from a client, information regarding an application that is performing an activity on the client;

determining a score distribution for hygiene scores of other clients on which a same type of application has performed a same activity, the determining comprising:

reviewing the hygiene scores of the other clients on which the same type of application has performed the same activity, the hygiene scores representing the other clients' propensities for being infected by malware; and determining, using the reviewed hygiene scores, a malware infection rate of the other clients relative to a malware infection rate of all clients, wherein the malware infection rate of the other clients being greater than the malware infection rate of all clients indicates that the activity performed by the application is likely malicious;

correlating the activity being performed by the application on the client with the score distribution for hygiene scores of the other clients on which the same type of application has performed the same activity;

computing, based on the correlation, a reputation score for the activity with respect to the application performing the activity; and identifying, based on the reputation score, whether the activity is an illegitimate activity for the application.

2. The method of claim 1, wherein identifying further comprises identifying the activity to be an illegitimate activity for the application based the reputation score indicating a poor reputation.

3. The method of claim 2, further comprising implementing a security policy for multiple clients, the security policy requiring blocking of applications of the same type from future performance of the illegitimate activity on those clients.

4. The method of claim 2, further comprising notifying the client that the activity has been identified as an illegitimate activity for the client, the notification indicating to the client to block the application from performing the illegitimate activity and to block future performance of the illegitimate activity by the application.

5. The method of claim 1, wherein the activity is selected from a group consisting of: introducing an executable file on the client, injecting code into a process on the client, modifying a registry key on the client, and accessing private user information that includes documents, passwords or settings.

6. The method of claim 1, wherein the receiving step further comprises receiving at least three items selected from a group consisting of: an identity of the application, an identification of the activity being performed by the application, a target of the activity, and a current machine hygiene score for the client.

7. The method of claim 1, wherein the malware infection rate of the other clients is an average malware infection rate.

8. The method of claim 1, wherein the malware infection rate of the other clients is a median malware infection rate.

9. A non-transitory computer-readable storage medium storing executable computer program instructions for hygiene-based determination of legitimacy of activities performed by applications on clients, the computer program instructions comprising instructions for performing steps comprising:
   receiving, from a client, information regarding an application that is performing an activity on the client;
   determining a score distribution for hygiene scores of other clients on which a same type of application has performed a same activity, the determining comprising:
      reviewing the hygiene scores of the other clients on which the same type of application has performed the same activity, the hygiene scores representing the other clients' propensities for being infected by malware; and
      determining, using the reviewed hygiene scores, a malware infection rate of the other clients relative to a malware infection rate of all clients, wherein the malware infection rate of the other clients being greater than the malware infection rate of all clients indicates that the activity performed by the application is likely malicious;
   correlating the activity being performed by the application on the client with the score distribution for hygiene scores of the other clients on which the same type of application has performed the same activity;
   computing, based on the correlation, a reputation score for the activity with respect to the application performing the activity; and
   identifying, based on the reputation score, whether the activity is an illegitimate activity for the application.

10. The computer-readable storage medium of claim 9, wherein identifying further comprises identifying the activity to be an illegitimate activity for the application based the reputation score indicating a poor reputation.

11. The computer-readable storage medium of claim 10, further comprising implementing a security policy for multiple clients, the security policy requiring blocking of applications of the same type from future performance of the illegitimate activity on those clients.

12. The computer-readable storage medium of claim 10, wherein the illegitimate activity for the application comprises injecting code into a process, wherein the application is a program that never legitimately performs the injection of code into the process, the injection of code by that program indicating that the program has been infected by malware.

13. The computer-readable storage medium of claim 10, further comprising notifying the client that the activity has been identified as an illegitimate activity for the client, the notification indicating to the client to block the application from performing the illegitimate activity and to block future performance of the illegitimate activity by the application.

14. The computer-readable storage medium of claim 9, wherein the receiving step further comprises receiving at least three items selected from a group consisting of: an identity of the application, an identification of the activity being performed by the application, a target of the activity, and a current machine hygiene score for the client.

15. A computer system hygiene-based determination of legitimacy of activities performed by applications on clients, the system comprising:
   a non-transitory computer-readable storage medium storing executable software modules, comprising:
      a receiving module for receiving, from a client, information regarding an application that is performing an activity on the client;
      a hygiene score module for determining a score distribution for hygiene scores of other clients on which a same type of application has performed a same activity, the determining comprising:
         reviewing the hygiene scores of the other clients on which the same type of application has performed the same activity, the hygiene scores representing the other clients' propensities for being infected by malware; and
         determining, using the reviewed hygiene scores, a malware infection rate of the other clients relative to a malware infection rate of all clients, wherein the malware infection rate of the other clients being greater than the malware infection rate of all clients indicates that the activity performed by the application is likely malicious;
      a correlation module for correlating the activity being performed by the application on the client with the score distribution for hygiene scores of the other clients on which the same type of application has performed the same activity;
      a reputation computation module for computing, based on the correlation, a reputation score for the activity with respect to the application performing the activity;
      a legitimacy identification module for identifying, based on the reputation score, whether the activity is an illegitimate activity for the application; and
   a processor configured to execute the software modules stored by the computer-readable storage medium.

16. The system of claim 15, wherein the receiving module is further configured to receive an identity of each application that introduces a new executable file on the client over time for categorization of those applications as known introducers of executable files.

17. The system of claim 15, further comprising a malware management module for implementing a security policy for multiple clients, the security policy requiring blocking of applications of the same type from future performance of the illegitimate activity on those clients, the security policy implemented responsive to the legitimacy determination module identifying that the activity is an illegitimate activity for the application.

18. The system of claim 15, further comprising a malware management module for notifying the client that the activity has been identified as an illegitimate activity for the client, the notification indicating to the client to block the application from performing the illegitimate activity and to block future performance of the illegitimate activity by the application, the notification sent responsive to the legitimacy determination module identifying that the activity is an illegitimate activity for the application.

19. The system of claim 15, wherein the legitimacy identification module is further configured for:
 identifying the activity to be an illegitimate activity for the application based the reputation score indicating a poor reputation; and
 determining, based on the identification, that the application performing the illegitimate activity is a malware portal, the malware portal being a legitimate program that normally never performs the illegitimate activity on the client, but which has been infected by malware for introducing new malware onto the client.

20. The system of claim 15, wherein the legitimacy identification module is further configured for:
 storing an identification that the activity is an illegitimate activity for the application; and
 applying the stored determination to future instances in which the same type of application has performed the same activity on another client to automatically determine that the application on that other client is likely infected by malware.

* * * * *